(12) United States Patent
Mathiesen et al.

(10) Patent No.: US 9,811,099 B2
(45) Date of Patent: Nov. 7, 2017

(54) PREDICTIVE POWER DISTRIBUTION SYSTEM FOR A MARINE VESSEL

(71) Applicant: Kongsberg Maritime AS, Horten (NO)

(72) Inventors: Eirik Mathiesen, Kongsberg (NO); Bjørnar Realfsen, Horten (NO); Ole Henrik Jørgensen, Horten (NO); Petter Faugstad Johannessen, Kongsberg (NO)

(73) Assignee: Kongsberg Maritime AS, Kongsberg (NO)

( * ) Notice: Subject to any disclaimer, the term of this patent is extended or adjusted under 35 U.S.C. 154(b) by 264 days.

(21) Appl. No.: 14/397,790

(22) PCT Filed: May 2, 2013

(86) PCT No.: PCT/EP2013/059120
§ 371 (c)(1),
(2) Date: Oct. 29, 2014

(87) PCT Pub. No.: WO2013/164392
PCT Pub. Date: Nov. 7, 2013

(65) Prior Publication Data
US 2015/0051746 A1 Feb. 19, 2015

(30) Foreign Application Priority Data

May 3, 2012 (NO) .................................... 20120507

(51) Int. Cl.
*G05F 1/10* (2006.01)
*H02J 3/14* (2006.01)
(Continued)

(52) U.S. Cl.
CPC ............... *G05F 1/10* (2013.01); *B63H 21/21* (2013.01); *G06N 5/04* (2013.01); *H02J 3/14* (2013.01); *B63H 23/24* (2013.01)

(58) Field of Classification Search
CPC .. G05F 1/10; G06N 5/04; B63H 21/21; B63H 23/24; H02J 3/14
See application file for complete search history.

(56) References Cited

U.S. PATENT DOCUMENTS

2006/0111855 A1   5/2006   Johansen et al.
2008/0058998 A1   3/2008   Breit
(Continued)

FOREIGN PATENT DOCUMENTS

EP              2009760 A2    12/2008
WO      WO2011/124470    * 10/2011

OTHER PUBLICATIONS

Colombo, Alessandro, "International Search Report," prepared for PCT/EP2013/059120, dated Aug. 27, 2013, three pages.
(Continued)

*Primary Examiner* — Nathan L Laughlin
(74) *Attorney, Agent, or Firm* — Winstead PC

(57) ABSTRACT

This invention relates to a system for reducing frequency and/or voltage variations in the power distribution system. The system comprises a power control unit being connected to at least one power generator and at least one consumer, power control system being adapted to monitor the measured load in the system from said at least one power generator and the power consumption from said at least one consumer, and a prediction allocating system for adapted to receive information from, each consumer related to the planned or predicted power consumption and to calculate expected power consumption of the system, and feeding the allocated power consumption to a motor generator system (MGS) controller.

11 Claims, 2 Drawing Sheets

(51) Int. Cl.
  *B63H 21/21*  (2006.01)
  *G06N 5/04*  (2006.01)
  *B63H 23/24*  (2006.01)

(56) References Cited

U.S. PATENT DOCUMENTS

| | | | |
|---|---|---|---|
| 2008/0284369 A1 | 11/2008 | Jones et al. | |
| 2010/0039054 A1* | 2/2010 | Young | B60L 11/08 318/376 |
| 2011/0040418 A1* | 2/2011 | Kalen | F03D 9/007 700/291 |
| 2011/0320073 A1* | 12/2011 | Rasanen | G05D 1/0005 701/21 |
| 2013/0166084 A1* | 6/2013 | Sedighy | G06Q 50/06 700/291 |

OTHER PUBLICATIONS

Sørensen, A. J., et al., "Torque and Power Control of Electrically Driven Marine Propellers," 2009, Control Engineering Practice, pp. 1053-1064.

Smogeli, Ø. N., et al., "Experimental Validation of Power and Torque Thruster Control," Proceedings of the 13th Mediterranean Conference and Automation Limassol, Cypros, Jun. 27-29, 2005, pp. 1506-1511.

Sørensen, A. J., et al., "Thruster Assisted Position Mooring System for Turret-Anchored FPSOs," Proceedings of the 1999 IEEE International Conference on Control Applications Kohala Coast—Island of Hawai'i, USA, Aug. 22-27, 1999, pp. 1110-1117.

Haschke, Robert, et al.; "On-Line Planning of Time-Optimal, Jerk-Limited Trajectories"; IROS Conference; Nice, France; 2008; six pages.

\* cited by examiner

PREDICTIVE POWER DISTRIBUTION SYSTEM FOR A MARINE VESSEL

The invention is a method for reducing frequency and/or voltage variations induced b variations in heavy consumer load or equipment failures and controlled changes in a marine power distribution system.

FIELD OF THE INVENTION

The present invention relates to a method for reducing frequency and/or voltage variations in the power distribution by the use of predicted future load changes used as feed forward towards speed/power control system on a Motor Generator Set (MGS), or turbo jet assist system for the engine, or Automatic Voltage Regulator (AVR) on the generator.

BACKGROUND OF THE INVENTION

A widely used marine power system today is diesel electric, meaning that the thrusters and/or propellers are electric driven and that power is provided by motor generator sets driven by such as diesel-engines, fuel cells, gas-turbines, dual fuel engines, etc. The most common way of doing speed control on MGS is done by a governor with setpoint adjustment from an overall Power Management System (PMS) or all done by the PMS itself The power is taken from a power plant with many consumers, where the thrusters normally being the dominant one. A high number of MGS are normally required to be connected to the power plant in order to keep a stable frequency and/or voltage in the occurrence of consumer load variations from e.g. electric heave compensation, draw-work, winch, crane and thrusters or sudden re-configuration of the distribution system. Frequency and/or voltage variations can be fatal for the power system and might lead to black-out, fallout of subsystems, and synchronization problems for generators that shall be connected to the power grid and increased fuel consumption. The offshore industry has for many years desired to reduce the number of online MGS without increased risk of frequency and/or voltage variations and potential black out, but no substantial solution has been provided for this problem. There are several benefits from reducing the number of online MGS, such as reduced NO emission, reduced sooting, reduced fuel consumption, and reduced maintenance on the engines.

Systems for handling load and power supply to compensate for variations in load are known in the field, such as exemplified in U.S.2006/111855 where power may be redirected from the thruster, e.g. to heave compensation, and U.S.2008/284369 where the power supply is controlled based on information about the torque in the motors and e.g. the signals from a dynamic positioning control system. Thus the known system are reactive in the sense that they relate to measured, already occurred, deviations, and relate to sensed power requirements, thus e.g. a simultaneous rise in the load from one or more consumers may exceed the available power increase rate and thus result in a system frequency reduction.

The proposed invention solves the problem with significant frequency and/or voltage variations when reducing the number of online MGS with use of the equipment normally installed on a vessel, as described in the accompanying claims.

The present invention thus presents ways of integrating overall predicted load changes on heavy consumers or other sudden re-configuration of the distribution system together with the speed/power/voltage control system combined with methods for predicting load variations in a way that has never been done before.

None of the known solutions address the fact that feed forwarding the predicted total load change can be used to obtain a more stable frequency and/or voltage, compared to traditional feedback compensation.

SUMMARY

A system for reducing at least one of frequency and voltage variations in the power distribution system in a marine vessel. The system includes a Dynamic Positioning ("DP") system, a power control unit being connected to at least one power generator and at least one consumer including at least one thruster or other dynamically controlled heavy consumers, power control system being adapted to monitor the measured load in the system from said at least one power generator and the power consumption from said at least one consumer. The system also includes a prediction allocating system adapted to receive information from each consumer related to the planned or predicted power consumption and to calculate expected power consumption of the system, and feeding the allocated power consumption to a motor generator system (MGS) controller so as to increasing or decreasing the power generation based on the planned or predicted power consumption in order to reduce total frequency variation depending on load variations forced by said at least one consumers. The DP system is adapted to calculate a change in load due to at least one of said at least one thruster based on a force demand related to at least one of the controlled axes of the marine vessel.

The invention will be described more in detail below with reference to the accompanying drawings, illustrating the invention by way of examples.

DETAILED DESCRIPTION

Figure 1:
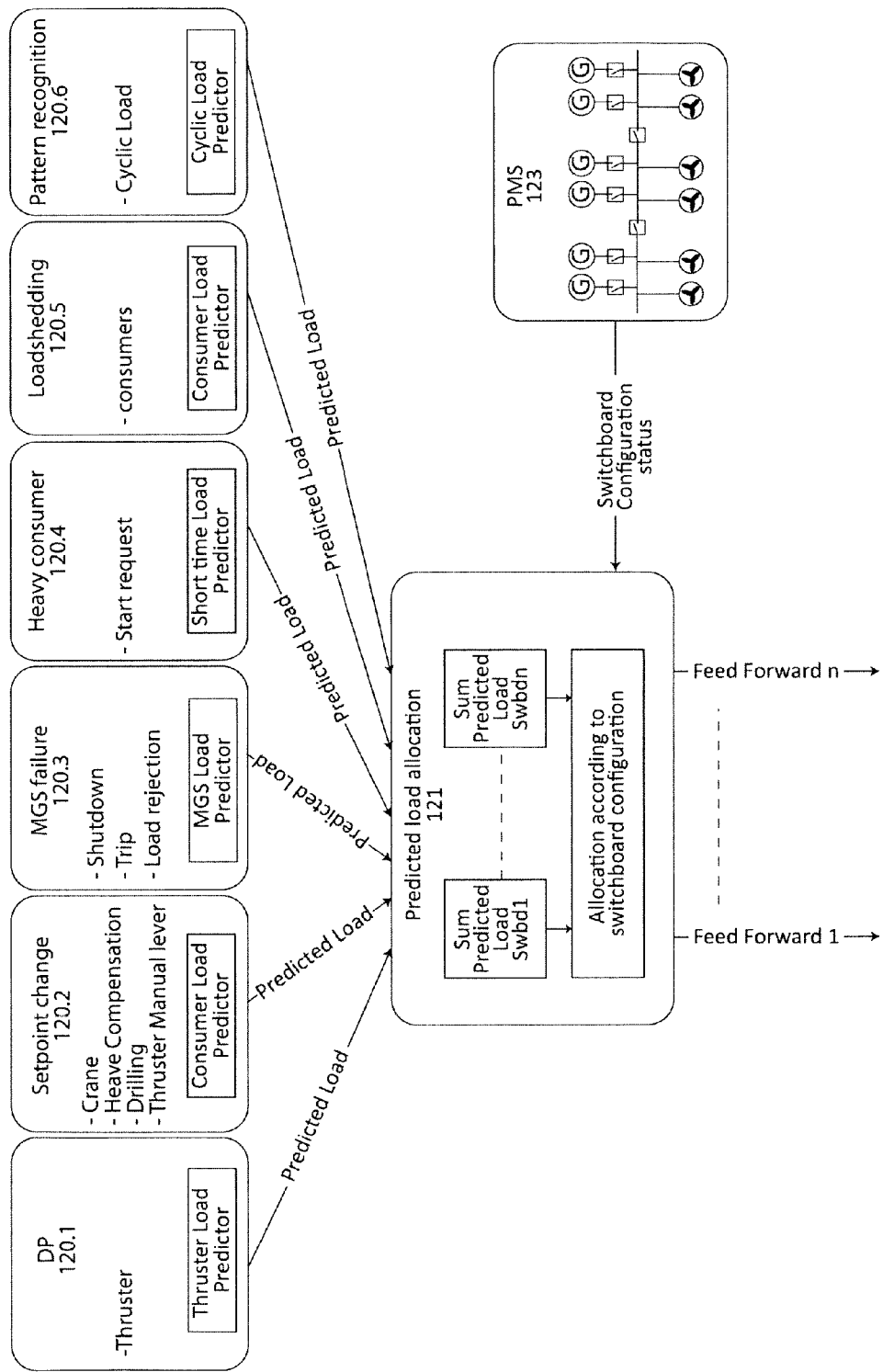
FIG. 1 illustrates the prediction and distribution part of the invention.
Figure 2:
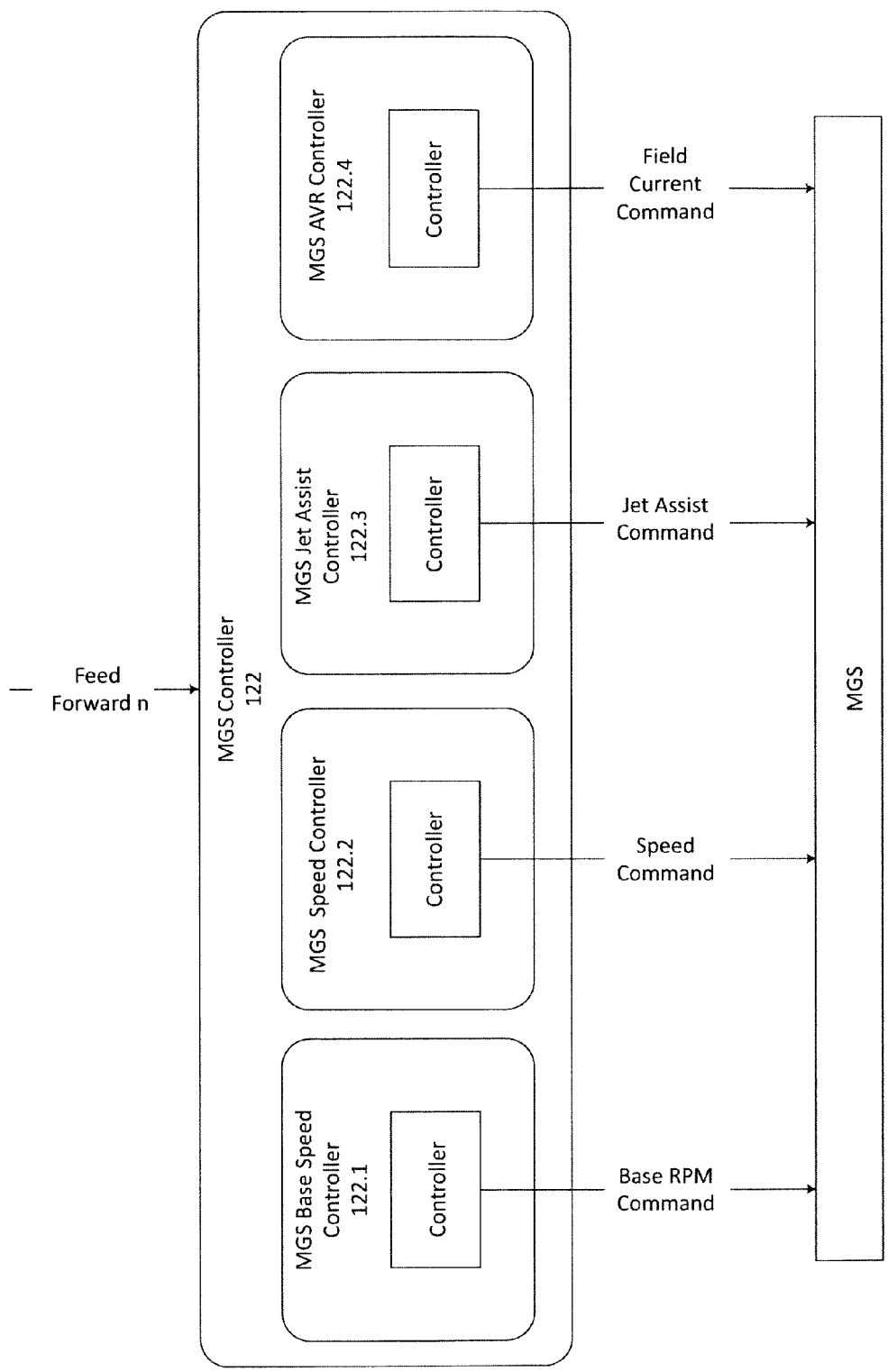
FIG. 2 illustrates the use of predicted feed forward values in MGS control.

The invention is related to a method and system as illustrated in FIGS. 1 and 2 for Dynamic Load Prediction (DLP) within a power management system. The DLP system preferably comprises a number of prediction functions 120.1-6, an overall predicted load allocation function 121 with distribution of feed forward values and a MGS controller 122.

The objective for the prediction functions is to predict the load change for the MGS. One of these predictions can e.g. be load change due to a planned vessel speed change, which can be calculated by the DP control system 120.1 based on the resulting force demand in each of the controlled axes in order to achieve the desired vessel speed. The predicted load can be a short- or long term prediction (described in details below).

Short term prediction can be used to give instant increase/decrease on MGS typical period of 1 sec, long to predications typical 10-30 sec can be used to allow frequency/voltage deviations which will be compensated by later load increase/decrease.

Another possible predicted change may be related to a change in MGS load due to setpoint change on any dynamic heavy consumer 120.2 such as cranes, heave compensation, drilling and/or a thruster manual lever. As an example a manual lever may both send signals to the thruster drive and to the setpoint change prediction function 120.2 which predict the action and amplitude of the intended change. MGS shutdown/load limitation/generator- or tie-breaker tripping which predict the amount of extra load on the remaining MGS 120.3 may also be included in the system according to the invention, as well as heavy consumer start control which predict the needed load for a start of a consumer 120.4.

Predicted load shedding may also be used, which predicts the amount of load to be reduced when a consumer is tripped 120.5

Pattern from any cyclic load e.g. heave compensation will give recognition of the load consumption and this pattern is used for longer time scale prediction inside the pattern recognition function 120.6

The pattern recognition function will be used to allow the system to operate with a frequency/voltage deviation if you have a load increase/decrease in the future which will compensate for the frequency/voltage deviation. Pattern recognition can also be used to predict a feed forward before actual load changes. As an example the system may experience a reduced operation frequency because a high load, but decide not to increase the generated power because the prediction shows that the load will decrease within an acceptable time window and the operation frequency thus be back to normal. In this way the power generation will be stable and unnecessary wear on the system as well as pollution will be reduced.

Thus the means and nature of the predictions themselves may differ depending on the consumer, from planned schedules to evaluations of equipment conditions and wear. The predicted power consumption may be determined on a long or short time horizon, e.g. as in a heave compensation (long term), or as a single rise in consumption (short term), e.g. resulting from a breakdown or shutdown of a generator.

The predicted load changes are sent further to the predicted load allocation function 121, where total predicted load changes from all individual prediction functions (120.1-6) are added together, verified and distributed as feed forward values to each affected MGS according to the switchboard configuration status received from power management system 123 including power feeding of relevant consumers. The switchboard configuration status sent from 123 to 121 will provide information about the available combinations of thrusters and generators etc, thus e.g. providing information concerning which generators are able to provide power to each of the consumers.

Each feed forward value may be sent further to a look up curve or table related to the fuel/rpm/kW relationship on a DC bus system to adjust the base rpm on a variable rpm MGS to achieve the needed torque, handled by a MGS Base Speed Controller 122.1. It may also be sent further to the speed/power control system for each MGS, where the value is added as a extra load contribution 122.2 and/or to the turbo jet assist system to improve the engine response 122.3 and/or to the generator AVR system to improve the voltage response 122.4.

Thruster load prediction in DP, 120.1

The DP system uses a constant jerk trajectory generator to calculate position, speed and acceleration setpoints for the DP controller. The jerk trajectory generator is a well known method e.g. described in Haschke et al, "On-line Planning of Time-Optimal, Jerk-Limited Trajectories" IROS conference, Nice 2008. An increase of the velocity setpoint will lead to a change in the acceleration of the vessel. This acceleration demand is converted to power, and is sent to the DLP. The trajectory generator provides a well defined acceleration progress, and is well suited for calculating long to future demands.

A DP positioned vessel that is drifting away from the position setpoint will have an increasing power demand until the drift off is stopped, and the vessel is moving towards the position setpoint again. The DP control system can estimate by model prediction the maximum power usage for a drift off, and can give this result to the DLP.

The DP control system may also predict load demand based on environmental measurements e.g. wind speed and direction which may affect the position and/or movement of the vessel, this is a typical short term prediction.

The DP control system may also run an analysis which simulates blackout on the switchboard sections and/or loss of thrusters. This analysis is mandatory on all DP class 2 and 3 vessels. The analysis will estimate the power usage on the remaining switchboard sections when one switchboard section blackouts. The analysis can also calculate the change in load demand in case of loss of thrusters. This can be sent to the DLP, so that the predicted load allocation function 121 will instantly know the power demand when a blackout/thruster loss is detected on one switchboard section.

Thus to summarize the invention relates to a system for reducing frequency and/or voltage variations in the power distribution system. The system comprises a power control unit being connected to at least one power generator and at least one consumer, power control system being adapted to monitor the measured load in the system from said at least one power generator and the power consumption from said at least one consumer. The system also includes a prediction allocating system for adapted to receive information from each consumer. This information is related to the planned or predicted power consumption and the system is thus adapted to calculate expected power consumption of the system, and feeding the allocated power consumption to a motor generator system (MGS) controller.

The prediction allocating system is also adapted to receive information from the power management system about switchboard configuration status and information relating to available power generators and thrusters. This way the required available power may be allocating according information about the available generators connected to the specific consumers.

The system preferably includes a dynamic positioning control system, wherein the dynamic positioning control system being adapted to define the force converted to load based on a speed or acceleration change. The power system is adapted to adjust the speed on the diesel engine and/or trigger the turbo jet assist system, based on predicted feed forward load contribution. This way the total frequency voltage variation may be reduced depending on load variations forced by the thrusters or other dynamically controlled heavy consumers.

The predicted information may represent different consumers and generators in the system, e.g. a dynamic positioning control system, possible generator shut down, breaker tripping, load shedding systems, and include information such as a setpoint change from at least one power consumer, time varying or periodic loads, manual controls or planed shutdown operations in consumers, generators, switchboards etc, reducing or increasing the available power in the system. This may be performed in short to (e.g. 1 second) or long term (e.g. more than 20 seconds) depending on the situation and consumer.

The calculated predicted power consumption is preferably a sum of the predicted consumption from each consumer, being allocated to the motor generator controller. If the predicted power is a time varying table or curve the values of single, stepped and time varying predictions are summed in a table or curve indicating; forward power consumption relative to a time scale.

The invention claimed is:

1. A system comprising:
   a Dynamic Positioning (DP) system;
   a pattern recognition function;
   a power control unit being connected to at least one power generator and at least one consumer including at least one thruster or other dynamically controlled heavy consumers, power control system being adapted to monitor a measured load in the system from said at least one power generator and power consumption from said at least one consumer;
   a prediction allocating system adapted to receive information from each consumer related to a planned or predicted power consumption and to calculate expected power consumption of the system, and feeding allocated power consumption to a motor generator system (MGS) controller so as to increasing or decreasing the power generation based on the planned or predicted power consumption in order to reduce total frequency variation depending on load variations forced by said at least one consumers;
   wherein the DP system is adapted to calculate a change in load due of said at least one thruster based on a force demand related to at least one of controlled axes of a marine vessel;
   wherein the pattern recognition function is configured to utilize a load consumption pattern from a cyclic load for longer time scale prediction; and
   wherein the system is configured to reduce, via the prediction allocating system and MGS, at least one of frequency and voltage variations in a power distribution system in the marine vessel.

2. The system according to claim 1, wherein the prediction allocating system is also adapted to receive information from a power managing system switchboard including information relating to available power generators and thrusters, thus allocating available power according to the available power generators.

3. The system according to claim 1, wherein the system includes a dynamic positioning control system, said dynamic positioning control system being adapted to define a force converted to load based on a speed or acceleration change, and said power distribution system is adapted to at least one of adjust the speed on a diesel engine and trigger a turbo jet assist system, based on predicted feed forward load.

4. The system according to claim 1, wherein predicted information represents a setpoint change from at least one power consumer.

5. The system according to claim 1, wherein predicted information is related to a generator shut-down reducing the available power in the system.

6. The system according to claim 1, wherein the prediction is in a time scale of 1 second, indicating short term changes in the system.

7. The system according to claim 1, wherein the prediction includes time varying power consumption.

8. The system according to claim 1, wherein the predicted power consumption is used to adjust a base rpm on a common rail variable rpm machine on a DC bus system allowing a machine to deliver torque required for operating the machine.

9. The system according to claim 1, wherein the calculation includes a summation of predicted power requirements.

10. The system according to claim 9, wherein the summation results in a curve or table including the predicted power consumption relative to time.

11. The system according to claim 7, wherein a time varying power consumption comprises a periodic variation in a load.

* * * * *